Figure 1:
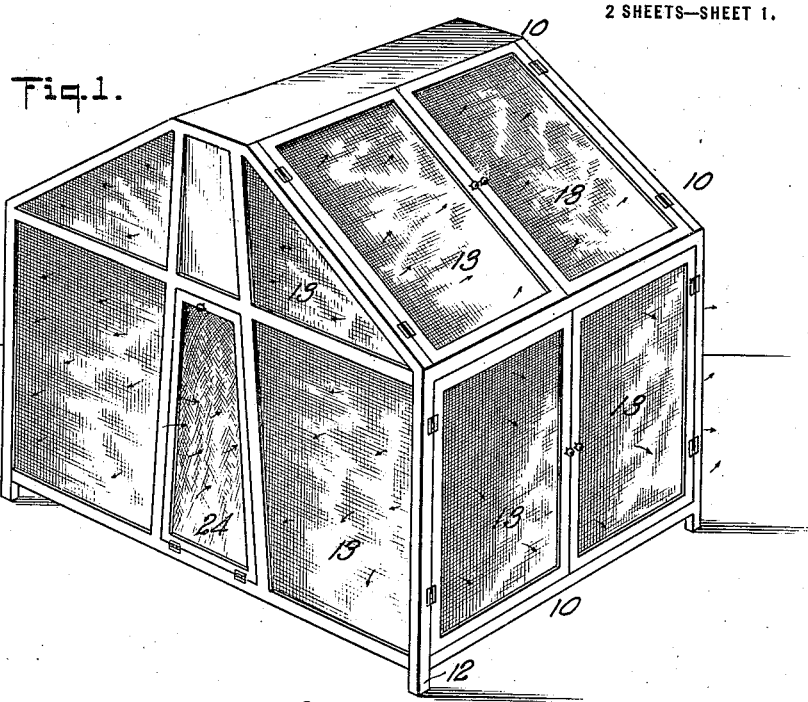

C. S. MUDGE.
COOLING DEVICE FOR FOODS.
APPLICATION FILED DEC. 8, 1915.

1,200,220.

Patented Oct. 3, 1916.
2 SHEETS—SHEET 1.

WITNESSES

INVENTOR
Clark S. Mudge
BY
ATTORNEYS

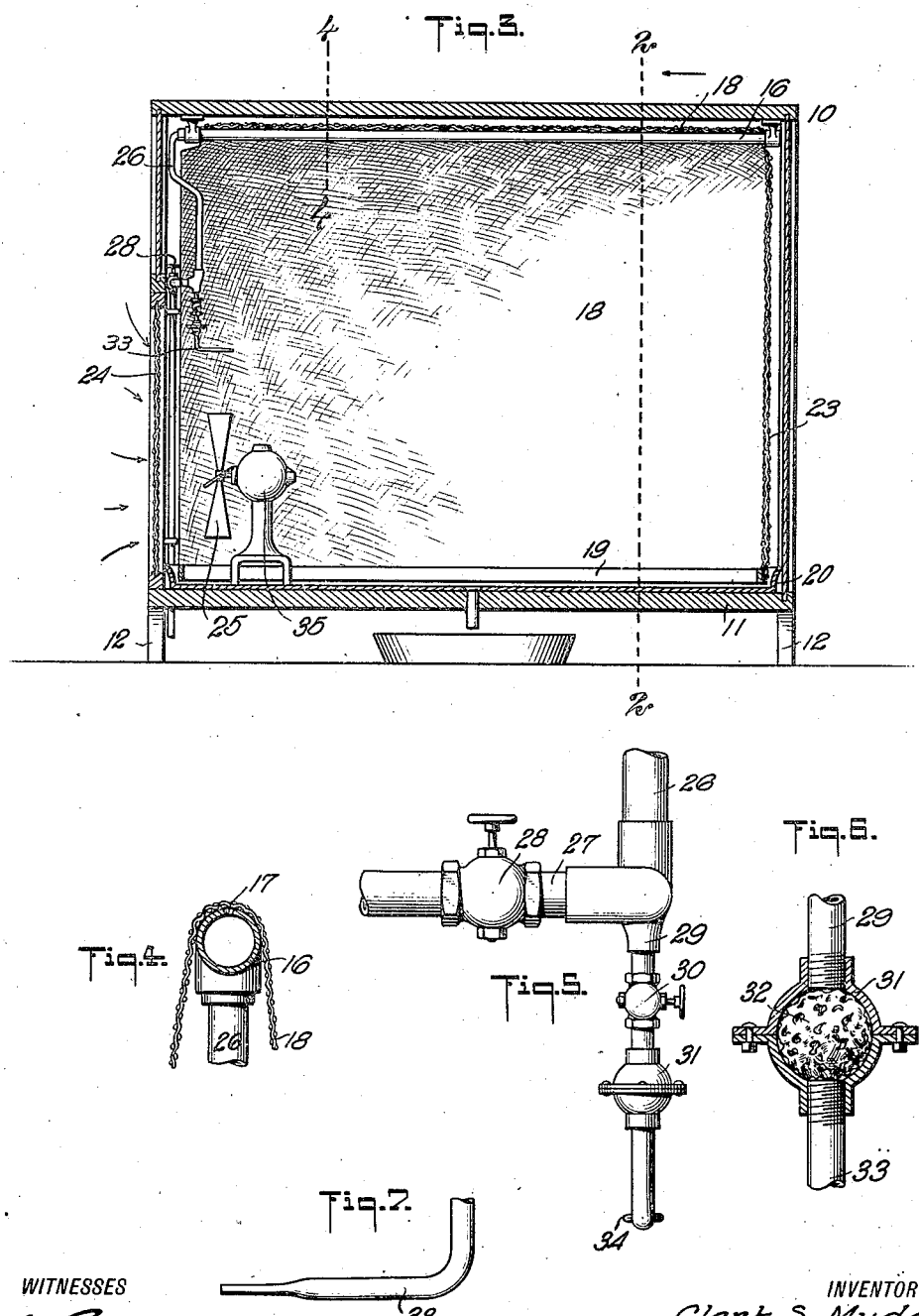

UNITED STATES PATENT OFFICE.

CLARK SALATHIEL MUDGE, OF ECHO, OREGON.

COOLING DEVICE FOR FOODS.

1,200,220.  Specification of Letters Patent.  Patented Oct. 3, 1916.

Application filed December 8, 1915. Serial No. 65,832.

*To all whom it may concern:*

Be it known that I, CLARK SALATHIEL MUDGE, a citizen of the United States, and a resident of Echo, in the county of Umatilla and State of Oregon, have invented a new and Improved Cooling Device for Foods, of which the following is a full, clear, and exact description.

My invention has for its object to provide a cooling device of attractive appearance which may be used to keep food cool and away from flies and other insects. The device is constructed with screens, within which the food may be disposed, there being a curtain which is sprayed with water through which air is forced by a fan, the air which circulates in the device being kept cool and moist by this means.

Other objects of the invention will appear in the following specification, in which the preferred form of my invention is described.

In the drawings similar reference characters denote similar parts in all the views, in which—

Figure 2:
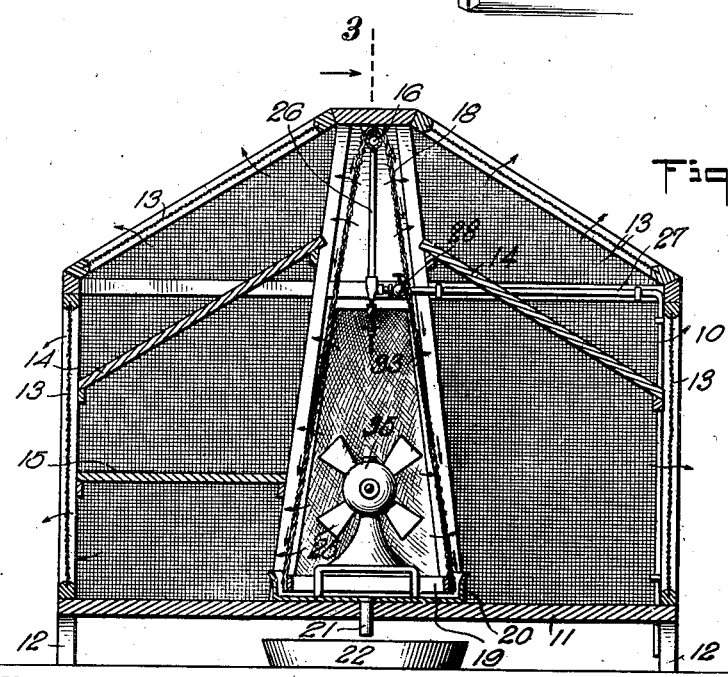

Figure 1 is a perspective view of my cooling device; Fig. 2 is a sectional view on the line 2—2 of Fig. 3; Fig. 3 is a sectional view on the line 3—3 of Fig. 2; Fig. 4 is a sectional view on the line 4—4 of Fig. 3; Fig. 5 is an enlarged fragmentary view showing the nozzle and the means for supplying the nozzle with water; Fig. 6 is a fragmentary sectional view illustrating the means for straining the water which flows to the nozzle; and Fig. 7 is a fragmentary view illustrating the nozzle.

By referring to the drawings, it will be seen that a frame 10 is provided having a floor 11 supported on legs 12, the frame members at the sides and the top of the device being inclosed with hinged screens 13 to prevent flies and other insects from reaching the food, which may be supported in the device on the shelves 14 and 15.

At the top of the device there is a horizontal pipe 16, having openings 17 at its top, there being disposed over this pipe 16 a curtain 18, the sides of which diverge downwardly, the bottom of the sides of the curtain being held in position by a frame 19, the said frame 19, with the bottom of the sides of the curtain 18, being disposed in a tray 20, so that when water or other fluid is supplied to the curtain 18 through the openings 17 in the pipe 16, this fluid will moisten the curtain 18, and any excess will flow to the tray 20, from which it may pass through the drip pipe 21, under which a pan 22 may be disposed in a manner readily understood. At the rear of the device, the sides of the curtain 18 are connected by a curtain-wall 23, and at the front of the device there is a curtain member 24, the width of which corresponds with the distance the sides of the curtain 18 are spaced apart, so that the fan 25 which is disposed between the walls of the curtains 18, will draw air through the curtain member 24, the said air accumulating between the sides of the curtain 18, and being forced by the increased pressure through the sides of the curtain 18 which have been moistened with water by means of the pipe 16 and the openings 17. Water is led to the pipe 16 through a pipe 26, this pipe 26 being supplied with water by a pipe 27, which is commanded by a valve 28. The pipe 26 leads upwardly from the pipe 27, there being another pipe 29 which leads downwardly from the said pipe 27, this pipe 29 being commanded by a valve 30 and leading to a cup 31 in which sponge 32 or other material may be disposed for straining the water which passes from the pipe 29. The water passes through the pipe 29, to the sponge 32 in the cup 31, and to the nozzle 33. This nozzle 33 is bent, and has a flat opening 34, so that the water will be directed between the sides of the curtain 18, to spray the air which is drawn rearwardly through the curtain member 24 by the fan 25, this fan 25 being operated by a motor 35, or by other suitable means.

The air, when it is drawn through the curtain member 24 will be cooled, and will be moistened, and this air will be further cooled and moistened as it is forced through the sides of the curtain 18 by the increased pressure of the air between the said sides of the said curtain, this air which has been cooled and moistened in the manner described, flowing into the device and around the shelves 14 and 15, so that the food which may be placed on the said shelves 14 and 15 will be kept cool and moist, and at the same time will be kept free from flies and other insects by means of the screens 13. The curtain 24 may be moistened in any suitable manner.

It will be understood that as the food is disposed at the outer side of the moist curtains, it is possible to reach the food without coming in contact with the moist walls of the curtains.

Having thus described my invention, what I claim as new and desire to secure by Letters Patent, is:

1. In a cooling device for foods, a curtain having walls spaced apart, screens spaced from the curtain walls, food supports disposed between the curtain walls and the screens, means for moistening the curtain, and a fan for forcing air into the space between the curtain walls so that the air will be cooled and moistened as it passes through the moistened curtain in the direction of the food supports.

2. In a cooling device for food, a curtain, a screen, a food support disposed between the curtain and the screen, means for moistening the curtain, and a fan disposed at the other side of the curtain for directing air through the curtain, so that the air will be cooled and moistened as it passes through the curtain to the food support.

3. In a cooling device for foods, a horizontal pipe having openings in its top, a curtain disposed over the pipe with its sides spaced apart so that the curtain will be moistened by water passing in the pipe through the openings, food supports disposed at the outer side of the curtain, and a fan for forcing air into the space between the curtain walls, so that the air will be cooled and moistened as it passes through the curtain in the direction of the food supports.

4. In a cooling device for foods, a horizontal pipe having openings, a curtain disposed over the pipe with the sides of the curtain spaced apart, a tray in which the lower ends of the curtain are disposed, food supports disposed at the outer side of the curtain, and a fan for forcing air into the space between the curtain walls so that the air will be cooled and moistened as it passes through the curtain in the direction of the food supports.

5. In a cooling device for foods, a screen compartment, a horizontal pipe disposed adjacent the top of the compartment and having openings, a curtain disposed over the pipe with the sides of the curtain between the sides of the screen compartment and spaced apart, a tray in which the lower ends of the sides of the curtain are disposed, food supports disposed between the curtain and the sides of the screen compartment, a fan for forcing air into the space between the curtain walls, so that the air will be cooled and moistened as it passes through the curtain in the space between the curtain and the sides of the screen compartment and means to supply the pipe with a fluid.

6. In a cooling device for foods, a screen compartment, a horizontal pipe disposed adjacent the top of the compartment and having openings, a curtain disposed over the pipe, with its sides spaced apart, a tray in the compartment within which the bottoms of the sides of the curtain are disposed, a fan between the sides of the curtain and adapted to draw air from the end of the compartment, so that the resulting pressure between the sides of the curtain will force the air through the curtain sides, a curtain at the said end of the compartment, a nozzle at the last mentioned curtain, and means for supplying the pipe and the nozzle with a fluid.

In testimony whereof I have signed my name to this specification in the presence of two subscribing witnesses.

CLARK SALATHIEL MUDGE.

Witnesses:
L. B. ASHBAUGH,
A. O. CARDEN.